United States Patent [19]
Saito et al.

[11] 4,388,725
[45] Jun. 14, 1983

[54] BUS TRANSMISSION SYSTEM

[75] Inventors: Seiichi Saito, Kawasaki; Yuji Kitano, Yokohama, both of Japan

[73] Assignee: A. Aoki & Associates, Tokyo, Japan

[21] Appl. No.: 210,674

[22] Filed: Nov. 26, 1980

[30] Foreign Application Priority Data

Nov. 29, 1979 [JP] Japan .................. 54-154575

[51] Int. Cl.$^3$ ............... H03K 7/08; H03K 17/00; H03K 19/00
[52] U.S. Cl. ........................ 375/36; 375/22; 307/255
[58] Field of Search ............ 375/17, 22, 36; 370/24, 370/85; 307/254, 255, 265; 340/825.63, 825.5

[56] References Cited
U.S. PATENT DOCUMENTS

| 3,237,164 | 2/1966 | Evans | 375/36 |
| 3,780,316 | 12/1973 | Wilhelm | 307/254 |
| 3,858,059 | 12/1974 | Khanna | 375/36 |
| 4,083,005 | 4/1978 | Looschen | 375/36 |
| 4,101,734 | 7/1978 | Dao | 375/36 |
| 4,186,379 | 1/1980 | Knoblock et al. | 340/825.5 |

FOREIGN PATENT DOCUMENTS 2335408 12/1974 Fed. Rep. of Germany .
53-136925 11/1978 Japan .

OTHER PUBLICATIONS
"Elektronik", vol. 27, No. 4, 4/1978, pp. 62-64.

Primary Examiner—Jin F. Ng
Attorney, Agent, or Firm—Staas & Halsey

[57] ABSTRACT

A bus transmission system in which two or more drive circuits are connected to the same transmission line, wherein both ends of a transmission line are grounded via a terminal resistance where is nearly equal to the characteristic impedance of the line. The drive circuits have three states consisting of a low-level state in which the output impedance is small, a high-level state in which the output impedance is small and a high-impedance state in which the output impedance is very high. When data is not to be transmitted, the drive circuit is placed in the high-impedance state, when data is to be transmitted, the high-impedance state of one of the drive circuits is converted into the low-level state in which the output impedance is small so that data can be transmitted based upon the low-level state and the high-level state, and when the transmission of data is finished, the drive circuit is placed in the low-level state again and thereafter placed in the high-impedance state. The data to be transmitted is modulated by a pulse width modulation device that uses a return to zero amplitude method as part of the modulation.

12 Claims, 14 Drawing Figures

| INPUT | | | OUTPUT |
|---|---|---|---|
| A | B | C | X |
| 1 | 1 | 1 | H |
| 0 | 1 | 1 | L |
| X | 0 | 1 | Hi-Z |
| X | 1 | 0 | Hi-Z |
| X | 0 | 0 | Hi-Z |

INPUT { "1" TTL LEVEL H
        "0" TTL LEVEL L
        X  DON'T CARE

OUTPUT { "H" HIGH LEVEL STATE
         "L" LOW LEVEL STATE
         "Hi-Z" HIGH IMPEDANCE STATE

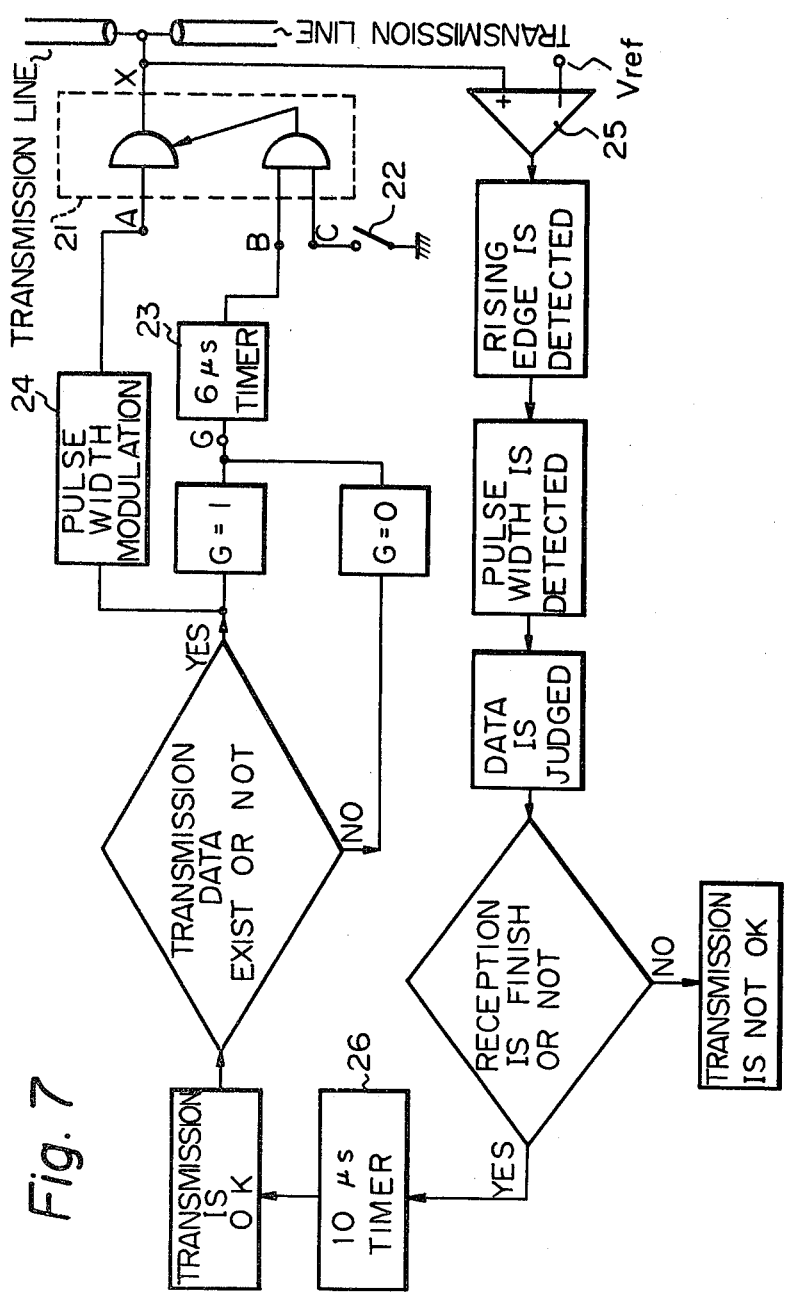

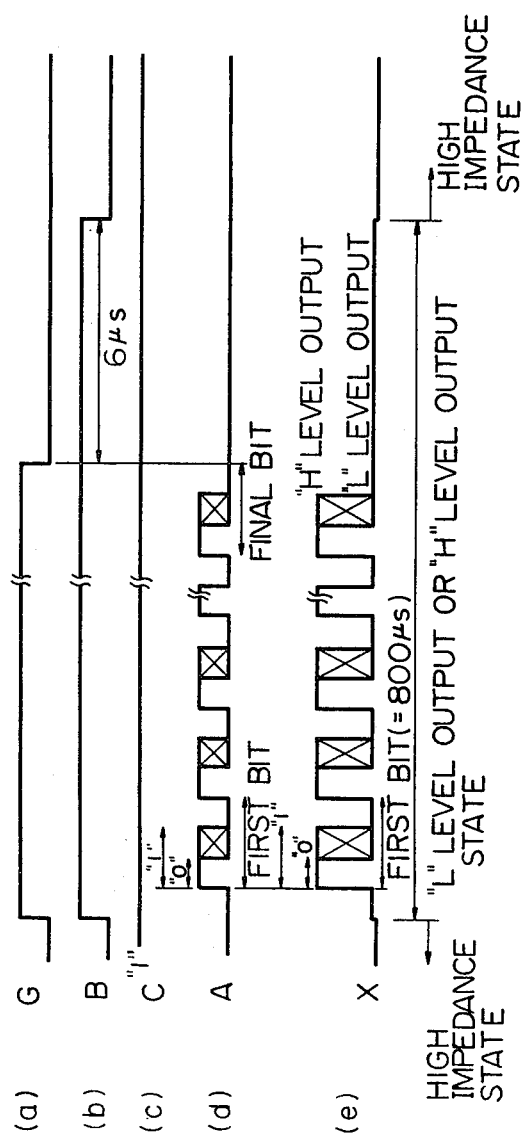

BUS TRANSMISSION SYSTEM

BACKGROUND OF THE INVENTION

The present invention relates to a bus transmission system, and more specifically to a bus transmission system for transmitting data at high speeds between a computer and input-output devices.

In the conventional widely employed bus transmission system, two or more transmitter-receivers are connected to a single transmission line, the individual transmitter-receivers being connected to a drive circuit and-/or to a receiver circuit such that information can be transmitted between them in both directions or in one direction only. In the above-mentioned system, the number of the transmitter-receivers connected to the same line varies depending upon the scale of the system. When the data is to be transferred at high speeds using the above transmission system, both ends of the line are terminated in a matched manner, and the input impedance of the receiving circuit is increased so as not to affect the transmission of signals.

On the other hand, when the transmission system is not required to transmit the data using the bus between the computer and the input-output devices, the power supply for the transmission system will often be turned off. The power supply for the transmission system will be turned on only when the transmission system is required to transmit data.

The above-mentioned requirements, however, are not satisfied by the conventionally employed circuits. According to the open-emitter drive circuit system which has been proposed thus far to satisfy the above-mentioned requirements, the residual voltage greatly affects the signal waveforms and imposes a limitation on the length of the transmission line or on the speed of data transmission.

SUMMARY OF THE INVENTION

An object of the present invention is to provide a bus transmission system which eliminates the above-mentioned defects, and which is capable of transmitting data at high speeds between the computer and the input-output devices.

Another object of the present invention is provide a bus transmission system which is capable of transmitting data at high speeds without being affected by the power supply irrespective of whether it is turned on or turned off.

A further object of the present invention is to provide a bus transmission system which is capable of transmitting data at high speeds without being affected by the residual voltage which is produced by the d-c resistance in the transmission line.

In order to achieve these objects, the present invention is directed to a bus transmission system in which two or more drive circuits are connected to the same transmission line and both ends of a transmission line are grounded via a terminal resistance which is nearly equal to the characteristic impedance of the line. The drive circuits of the present invention have three states consisting of a low-level state and a high level state in each of which the output impedance is small and a high-impedance state in which the output impedance is very high. When data is not to be transmitted, the state of the drive circuits is placed in the high-impedance state, when data is to be transmitted, the high-impedance state of the drive circuits is changed into the low-level state in which the output impedance is small so that the data can be transmitted based upon the low-level state and the high-level state. When the transmission of data is finished, the drive circuits are placed in the low-level state again and then placed in the high-impedance state.

Further features and advantages of the present invention will become apparent from the ensuing description with reference to the accompanying drawings to which, however, the scope of the invention is in no way limited.

BRIEF DESCRIPTION OF THE DRAWINGS

FIG. 7 is a diagram illustrating a transmission control circuit including the drive circuit of the present invention;

FIG. 10 is a time chart illustrating the waveforms at each of the portions of FIG. 7.

DETAILED DESCRIPTION OF THE PREFERRED EMBODIMENT

Figure 1:
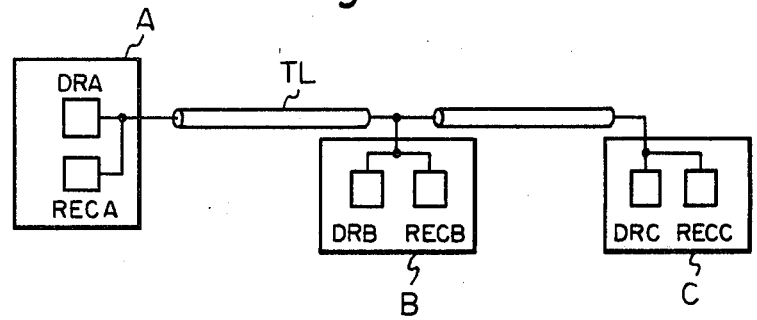
FIG. 1 is a diagram illustrating the construction of a bus transmission line in a bus transmission system.

The bus transmission line contemplated by the present invention consists, as shown in FIG. 1, of a transmission line TL to which are connected bus drive circuits DRA to DRC and receiving circuits RECA to RECC of a plurality of devices.

FIG. 1 illustrates the bus transmission line allowing two directions of transmission. The bus transmission line contemplated by the present invention, however, consists of a single transmission line to which are connected two or more drive circuits, and need not necessarily be able to transmit the data in the two directions. Namely, the bus transmission line of the present invention may transmit the data in one direction only since it is constructed so that only the receiving circuit RECA only is connected in the device A, and the drive circuits ORB and ORC are connected in the devices B and C, respectively.

Although FIG. 1 illustrates three devices, four or more devices will be often employed. In general, however, the number of devices connected to the same line varies depending upon the scale of the system. Further, when the data is to be transmitted at high speeds using such a transmission system, both ends of the line are terminated with matched impedances. The input impedance of the receiving circuit is increased so as not to affect the transmission of signals.

Figure 2:
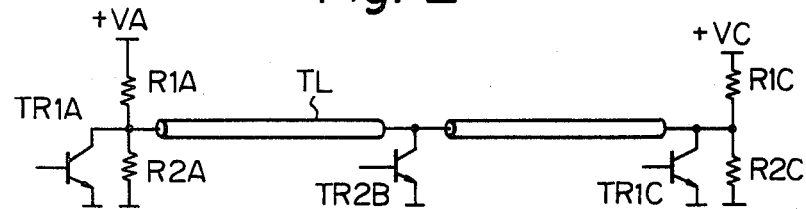
FIGS. 2 and 3 are diagrams illustrating the conventional bus transmission lines.

FIG. 2 illustrates a conventional bus drive circuit. Here, a portion of the output circuit only is shown.

The operation of this circuit will be described below.

Collectors of transistors TR1A to TR1C are connected to the transmission line, resistors R1A and R2A are connected to one end of the line and resistors R1C and R2C are connected to the other end of the line. In such an open-collector transmission system, each of the transistors is usually in the non-conductive state, and the transistor which sends out the significant condition is in the conductive state. The ends on one side of the resistors R1A and R1C are connected to power supplies Va, Vc of a positive polarity; the voltage of the transmission line when all of the transistors are non-conductive is placed in a sufficiently high level as compared with the low-level voltage when the transistors are conductive. Further, since the ends are terminated in a matched manner, the values, $$\frac{\text{Resistance } R1A \times \text{resistance } R2A}{\text{Resistance } R1A + \text{resistance } R2A} \text{ and}$$

$$\frac{\text{Resistance } R1C \times \text{resistance } R2C}{\text{Resistance } R1C + \text{resistance } R2C}$$

should be set to be nearly equal to the characteristic impedance of the line. Such a drive circuit has an advantage in that it can be easily controlled, but has defects which are mentioned below. Referring to FIG. 1, the power supplies of the devices A, B and C may be turned on and off independently of one another. Referring to the circuit of FIG. 2, for example, a voltage of a properly high level will not be obtained when one of the power supplies Va or Vc is turned off. Therefore, even when the power supply for the device C is turned off, the power supply Vc must be turned on at all times, or the electric power must be supplied from one of the other devices A or B.

A conventional example which removes the above-mentioned defects will be explained below with reference to FIG. 3 which illustrates a so-called open-emitter drive circuit in which emitters of the transistors TR2A to TR2C are connected to the transmission line. Resistors R3A and R3C having resistance equal to the characteristic impedance of the line are connected to both ends of the line, and other ends of the resistors are grounded. With the open-emitter system, the transistors are usually non-conductive, the transmission line is of a low level, the transistor which sends out the significant condition becomes conductive, and the transmission line is placed at a high level. In this system, the transistors are non-conductive and in a low level even when the power supplies of each of the devices are non-conductive; therefore, the condition of the transmission line is not affected.

Figure 3:
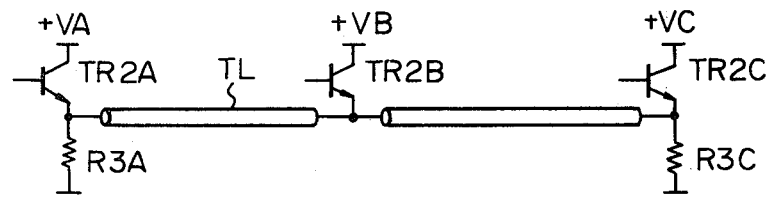

In the open-emitter system of FIG. 3, however, the output impedance of the drive circuit becomes great when the transistors are non-conductive. Therefore, when the length of the transmission line is so long that the d-c resistance is not negligible, a residual voltage effect will develop.

The residual voltage will be mentioned below with reference to FIG. 4, in which when the transistor TR2' is conductive, its output current $I_{on}$ is given by $V_{on}/R3'+V_{on}/(R3'+\gamma dc)$, where $V_{on}$ denotes an emitter voltage when the transistor is conductive, R3' denotes a resistance of the terminal resistors connected to both ends of the line, and $\gamma dc$ denotes a d-c loop d-c resistance of the transmission line.

If now the transistor TR2' is converted from the conductive state to the non-conductive state, the emitter voltage $V_R$ of the transistor TR2' is given by $V_{on} - I_{on}/((1/R3')+(1/Zo))$, where Zo denotes the characteristic impedance of the transmission line. For example, when twisted pair wires having a diameter of 0.5 mm and a length of 500 meters, are used as the transmission, the characteristic impedance Zo will be 90 ohms, the loop d-c resistance will be 90 ohms, and the resistance R3' of the terminal resistor will be 90 ohms.

In this case, $V_R$ equals $\frac{1}{4}$ Von. If Von is 3 volts, the emitter voltage $V_R$ of the transistor TR2' is 0.75 volt. The residual voltage becomes maximal when the transistor is rendered non-conductive from the conductive state, and then gradually decreases. The residual voltage will be completely extinguished after the time required for the data to round-trip through the transmission line has passed. For example, if the length l is 500 meters, $V_R$ will become zero volts after about 5 microseconds have passed.

Figure 4:
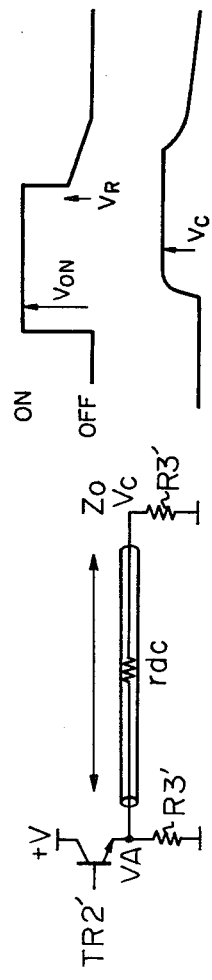
FIG. 4 is a diagram illustrating the waveforms which are propagating on the transmission line of FIG. 3.

FIG. 4 deals with the case when the drive circuit is connected to an end of the transmission line. However, the same holds true even when the drive circuit is connected to a middle point of the transmission line. Although FIG. 4 illustrates the system of the open-emitter type, the same generally holds true even for the open-collector system of FIG. 2 in which the output impedance becomes great when the drive circuit is placed in the high level or the low level.

With reference to the other end of the line of FIG. 4, i.e., with reference to the receiving side, the waveform $V_c$ tends to becomes more flattened when it is changed from the conductive state to the non-conductive state than when it rises from the non-conductive state to the conductive state.

According to the transmission system mentioned above, the residual voltage so greatly affects the signal waveforms that it imposes limitations on the length of the transmission line and on the data transmission speed.

Figure 5:
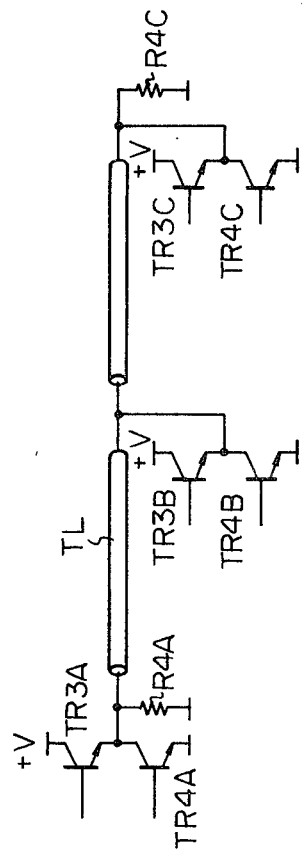
FIG. 5 is a diagram illustrating the construction of a bus transmission system accoding to an embodiment of the present invention.

FIG. 5 illustrates a transmission circuit according to an embodiment of the present invention. In the drive circuits of FIG. 5, the emitter of a transistor TR3A and the collector of a transistor TR4A are both connected to the transmission line, and the emitter of the transistor TR4A is grounded. The same holds true for the transistors TR3B, TR4B, TR3C and TR4C of other devices. Terminal resistors R4A and R4C which have resistance nearly equal to the characteristic impedance of the transmission line, are connected to both ends of the line, and the other ends of the resistors R4A and R4C are grounded. The drive circuits work as tri-state circuits which have three states, i.e., a low-level state in which TR4 is conductive and TR3 is non-conductive, a high-level state in which TR3 is conductive and TR4 is non-conductive, and a high-impedance state in which TR3A and TR4A are non-conductive.

In the transmission system of the present invention, all of the drive circuits usually are placed in a high-impedance state; in this state, the voltage of the transmission line is nearly zero volts due to the terminal resistors.

This state, therefore, is detected by the receiving circuit as being the same as the low-level state.

Further, the drive circuits remain in the high-impedance state even when the power supplies for the drive circuits are turned off, thus the drive circuits are not affected by the turn on or turn off of the power supplies of the devices.

The drive circuit which is to transmit the data is placed in either the low-level or the high-level. According to this system, however, the drive circuit necessarily is placed in the low level during the initial stage of the data transmission, and also is placed in the low-level state when the transmission of the data is completed.

Namely, the drive circuits operate so as to be placed in a high-impedance state→low-level state→transmission of data (low-level state or high-level state)→low-level state→high-impedance state.

By so doing, either one of TR3 or TR4 is conductive while the data is being transmitted, and the output impedance of the drive circuit can be maintained at a small value irrespective of whether the drive circuit is in the high level or in the low level, thus eliminating the effects caused by the residual voltage. Further, since the high-impedance state is discriminated by the receiving circuit as being the same as the low level, the transmission waveforms are not disturbed even when the drive circuit is transferred to the high-impedance state after having transmitted data.

In order for the drive circuit to be placed in the low-level state during the initial stage and the final stage of data transmission, the data to be transmitted should be subjected to the modulation of amplification by the return to zero RZ method or to the modulation of pulse width to determine "0" and "1" depending upon the pulse width of the high level. It is further allowable to add extra bits to the first portion and to the last portion of the data that is to be transmitted.

Figures 6A, 6B:
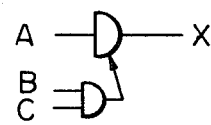
FIGS. 6A to 6C are, respectively, a block diagram of a drive circuit according to the present invention, a truth table, and a diagram illustrating another embodiment of the drive circuit.
Figure 6C:
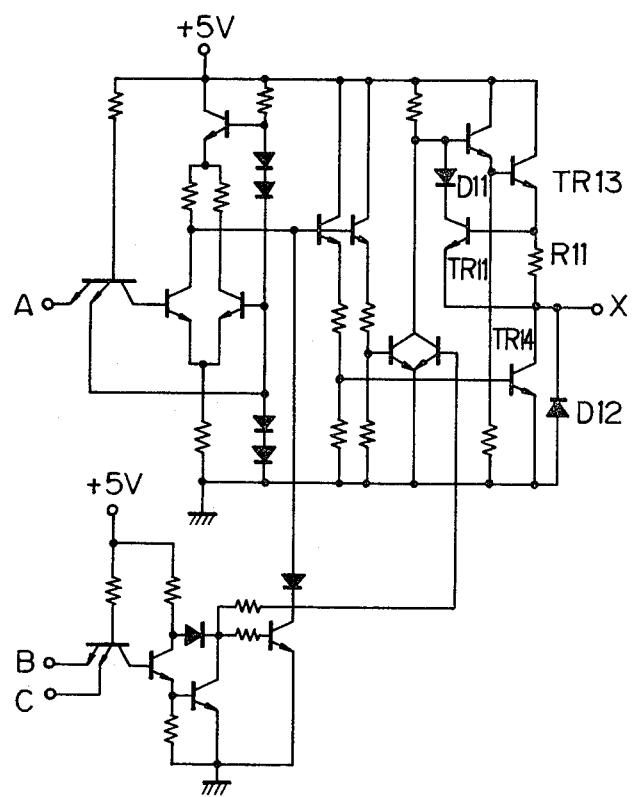

FIG. 6A is a block diagram of one of the drive circuits composed of transistors TR3A and TR4A, TR3B and TR4B, and TR3C and TR4C that are shown in FIG. 5; FIG. 6B is a truth table for the input and output states of the circuit of FIG. 6A; and FIG. 6C illustrates in detail another embodiment of the circuit of the block diagram of FIG. 6A. In FIG. 6B, the input "1" represents an input of the high level, the input "0" represents the input of the low level, and a mark * represents an input of either the high level or the low level. With reference to the output, symbol "H" represents the high-level state, "L" represents the low-level state and "Hi-Z" represents the high-impedance state. In FIG. 6C, the transistors TR13 and TR14 correspond, respectively, to transistors TR3 (3A, 3B and 3C) and to TR4 (4A, 4B and 4C) of FIG. 5. In the high-impedance state, the transistors TR13 and TR14 are non-conductive. In the high-level state, the transistor TR13 is conductive and the transistor TR14 is non-conductive. In the low-level state, the transistor TR13 is non-conductive and the transistor TR14 is conductive. With reference to FIG. 6C, a protection circuit is formed by a circuit consisting of a transistor $TR_{11}$, a diode $D_{11}$, a resistor $R_{11}$ and a diode $D_{12}$. Further, the resistance of the resistor $R_{11}$ is selected to be small so that the output impedance is small when the drive circuit is in the high-level state.

FIG. 7 illustrates a transmission control circuit including a drive circuit that is shown in FIGS. 6A and 6C. In FIG. 7, a drive circuit 21 is the one that is shown in FIGS. 6A and 6C, and points A, B, C and X correspond to points A, B, C and X of FIGS. 6A and 6C. A contact point 22 works to suppress the noise that may generated in the output X of the drive circuit 21 when the power supply of the device is turned on and off. When the power supply is turned off, the input C is in the low-level state "0" so that the output X is maintained in the high-impedance state. A 6-μS timer 23 produces the output "0" when the input G is "0", produces the output "1" when the input changes from "0" to "1", and produces the output which changes from "1" to "0" after 6 microseconds have passed from the moment at which the input G is changed from "1" to "0". The 6-μS timer 23 can be realized by a shift register or by a retriggerable monostable multivibrator. The timer 23 is necessary because it works to maintain the low-level state until there is no effect of residual voltage, and then converts the low-level state to the high-impedance state. A pulse width modulation circuit 24 works to modulate the pulse width responsive to whether the data is "0" or "1". The function of this circuit will be ilustrated later with reference to FIGS. 8A and 8B.

A receiving circuit 25 will be a comparator having high input impedance. The receiving circuit 25 determines that the voltage of the transmission line line which is connected to the input thereof is "1" when the output of a given drive circuit is at the high level, and "0" when the output of a given drive circuit is at the low level and when all of the drive circuits are in the high-impedance state. The rising edge and pulse width of the output of the receiving circuit 25 are detected to determine whether there is data which is being received. A 10-μS timer 26 is provided so that two or more drive circuits will not be turned on at the same time. That is, since other drive circuits will be in the low-level state until 6 microseconds have passed after the reception of the final data, the transmission of data commences when all of the drive circuits have been placed in the high-impedance state 10 microseconds after the reception of the final data. If the timer 23 is of high precision, the time of 10 microseconds of the timer 26 can be further shortened.

Figure 8A:
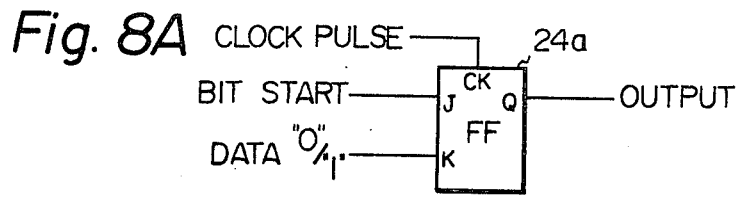
FIGS. 8A and 8B are diagrams illustrating a data modulation circuit according to the present invention.
Figure 8B:
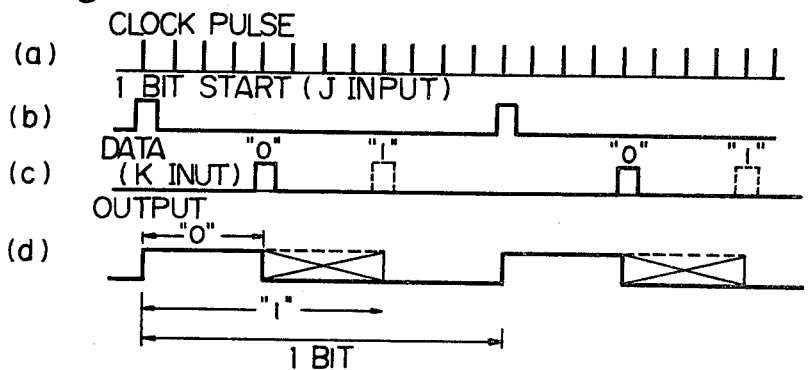

FIG. 8A illustrates an example of the pulse width modulation circuit 24 of FIG. 7, which comprises a JK flip-flop 24a. The diagram (a) of FIG. 8B shows the waveform of clock pulses applied to the circuit 24a, the diagram (b) of FIG. 8B shows the waveform of bit start signals applied to the input J of the circuit 24a, the diagram (c) of FIG. 8B shows the waveform of a data "0"/"1" applied to the input K of the circuit 24a, and the diagram (d) of FIG. 8 shows the waveform of an output of the circuit 24a.

Figure 9A:
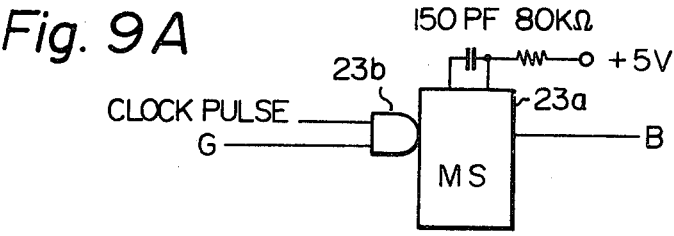
FIGS. 9A and 9B are diagrams illustrating a timer circuit according to the present invention.
Figure 9B:
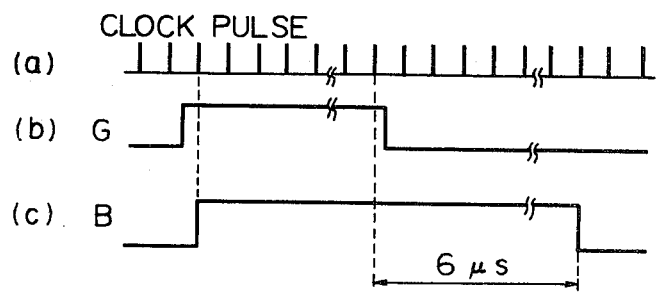

FIG. 9A illustrates an example of the 6-μS timer 23 of FIG. 7, which comprises a retriggerable monostable multivibrator 23a, an AND gate 23b, and a capacitor and a resistor for determining a time constant. The diagram (a) of FIG. 9B illustrates clock pulses that are fed to one input of the AND gate 23b, the diagram (b) of FIG. 9B illustrates the waveform of signals G fed to another input of the AND gate 23b, and the diagram (c) of FIG. 9B illustrates the waveform of an output B of the monostable multivibrator 23a. The signals G and B correspond to those of FIG. 7. A time constant of 6 microseconds can be set if the capacitor has a capacitance of 150 pF and the resistor has a resistance of 80 kilohms. The signal G does not necessarily rise in synchronism with the clock pulses. Strictly speaking, therefore, the signal B lags behind the signal G by a maximum period of one clock pulse.

Diagrams (a) to (e) of FIG. 10 illustrate time charts of waveforms of the control circuit of FIG. 7, in which the diagram (a) of FIG. 10 shows the input waveform into the 6-μS timer 23, the diagram (b) of FIG. 10 shows the output waveform of the 6-μS timer 23, i.e., shows the waveform that is applied to the input terminal B of the drive circuit 21, the diagram (c) of FIG. 10 shows an input signal "1" applied to the input terminal C of the drive circuit 21, the diagram (d) of FIG. 10 shows the signal waveform applied to the input terminal A of the drive circuit 21, i.e., shows the output waveform of the pulse width modulation circuit 24, and the diagram (e) of FIG. 10 shows the output waveform of the drive circuit 21. The time after the level at the terminal B is converted from "0" to "1" and the time until the first bit of the input data is fed to the terminal A, may be sufficiently reduced. The time in which the state of the drive circuit converts from the high-impedance state to the low-level state to produce the first bit, can be infinitely reduced provided the pulse width of the output X is not affected. According to the embodiment of the present invention, one bit lasts 800 microseconds as shown in FIG. 10. By using a cable which corresponds to RG-63B/U, therefore, the data can be transmitted up to a distance of 1.5 kilometers. Further, when the pulse has a great width, the effect of the residual voltage will last for $$4 \ \mu S/km \times 1.5 \ km \times 2 = 12 \ \mu S$$

on the sending side. According to the embodiment of the present invention in which the pulse width is modulated the transmitted waveforms are not affected even when the time after the completion of the data transfer to the moment when the drive circuit is placed in the high-impedance state is selected to be about 6 microseconds.

Usually, the effect of residual voltage appears when the drive circuit is converted from the low-level state after the data has been transmitted to the high-impedance state. This effect appears conspicuously as the duration of high-level state becomes greater than the duration of low-level state while the data is being transmitted. When the data is modulated by adding extra bits to the first portion and the last portion of the NRZ (non-return to zero) data, the high-level state often lasts a long time. In this case, the time must be lengthened from the moment at which the drive circuit is placed in the low-level state after the data has been transmitted to the moment at which the drive circuit is placed in the high-impedance state, imposing a limitation on the speed of data transmission. On the other hand, when the data is modulated by modulating the amplitude by the return to zero RZ method or by modulating the pulse width, the high-level state does not last long, and the time can be shortened from the moment at which the drive circuit is placed in the low-level state after the data has been transmitted to the moment at which the drive circuit is placed in the high-impedance state.

According to the transmission system of the present invention as mentioned in the foregoing, the data can be transmitted at high speeds without being affected when the power supplies for the devices are independently turned on or off, and without being affected by the residual voltage produced by the d-c resistance in the transmission line.

We claim:

1. A bus transmission system including transmitting means for transmitting data over a transmission line, said system comprising at least two drive circuits connected to said transmission line, and a source voltage comprising:

first and second terminal resistors each having a first terminal operatively connected to opposite ends of the transmission line, each having a second terminal operatively connected to ground and each having a terminal resistance which is nearly equal to the characteristic impedance of the transmission line for forcing the transmission line to ground level between data transmissions;

said at least two drive circuits each having an output voltage and an output impedance and each having three states, said states including a first-level state in which the output voltage is at a first level which is ground level and the output impedance is a low impedance, a second-level state in which the output voltage is at a second level corresponding to the source voltage and the output impedance is the low impedance and a high-impedance state in which the output impedance is a high impedance resulting in substantially decoupling the respective drive circuit from said transmission line, and each having means for detecting the signal transmitting condition and state means, responsive to said detecting means, for state changing which when said data is not to be transmitted places said drive circuits in the high-impedance state, and when said data is initially transmitted, the high-impedance state of said drive circuits being converted into the first-level state in which the output impedance is at the low impedance, thereafter said data being transmitted by said transmitting means based upon the first-level state and the second-level state, and when the transmission of said data is finished, each drive circuit being placed in the first-level state again and thereafter being placed in the high-impedance state by said state means.

2. A bus transmission system according to claim 1, further comprising at least two means for modulating said data, each operatively connected to the respective said state means of said at least two drive circuits, the amplitude and the pulse width of said data being modulated based upon the method of return to zero.

3. A bus transmission system according to claim 2, wherein said means for modulating includes data means for return to zero modulating said data and control means for outputting a control signal which indicates a data transfer period, wherein said at least two drive circuits are operatively connected to receive an input "1" and an input "0" and to receive an input signal "1" and an input signal "0", and wherein said state means of said at least two drive circuits each comprise:

an AND circuit which has a first input terminal operatively connected to the respective said control means and a second input terminal, both terminals operatively connected to receive the input "1" and the input "0", for generating an output "1" when the input "1" is inputted to the first and second input terminals thereof and for generating the output "0" when the input "0" is inputted to either the first or second input terminals; and a gate circuit having a first input operatively connected to the output of said AND circuit, having a data input operatively connected to the respective said data means and to receive the input signal "1", an input signal "0" or a combination of input signals "1" and "0", for generating an output of the second level or the first level responsive to the input signal "1" and "0", respectively, or the combination thereof when the output "1" is generated by said AND circuit, and which is placed in the high-impedance state at the output terminal irrespective of the input signals "0" and "1" when the output "0" is generated by said AND circuit.

4. A bus transmission system according to claim 3, wherein said gate circuit further comprises:
- a first transistor having a collector operatively connected to a power supply, having an emitter operatively connected to the transmission line and having a base operatively connected to the output of said AND circuit and to receive the input signals "1" and "0"; and
- a second transistor having a collector operatively connected to the transmission line, having an emitter operatively connected to ground and having a base operatively connected to the output of said AND circuit and to receive the input signals "1" and "0", so that when the output "0" is generated by said AND circuit, there is established the high-impedance state in which said first and second transistors are non-conductive, and so that when the output "1" is generated by said AND circuit, and when there is an input signal "0", there is established the first-level state in which said first transistor is non-conductive and said second transistor is conductive and when there is an input signal "1" there is established the second-level state in which said first transistor is conductive and said second transistor is non-conductive.

5. A bus transmission system according to claim 2, wherein said at least two drive circuits each comprise:
- a first transistor having a collector operatively connected to a power supply and having an emitter operatively connected to the transmission line; and
- a second transistor having a collector operatively connected to the transmission line and having an emitter operatively connected to ground.

6. A bus transmission system according to claim 2, wherein each of said means for modulating said data generates a negative and positive phase modulation signal, and a control signal having first and second values, and wherein each said drive circuit comprises:
- a first transistor having a base receiving the negative phase of the modulation signal and the control signal; and
- a second transistor having a base receiving the positive phase of the modulation signal and the control signal, when the control signal is the second value and the modulation signal is the negative phase, said first transistor is turned on, said second transistor is turned off and the second value is output, when the control signal is the second value and the modulation signal is the positive phase, said first transistor is turned off, said second transistor is turned on and the first value is output, and when the control signal is the first value both said first and second transistors are turned off and the high impedance is output.

7. A bus transmission system according to claim 1, further comprising a contact circuit operatively connected between one of said at least two drive circuits and ground, for suppressing noise that may be generated in the output of said drive circuit when a power supply of said bus transmission system is turned on and off.

8. A bus transmission system, operatively connected to a transmission line, for transmitting and receiving transmit and receive data, comprising:
- a drive circuit having first through third inputs and having an output operatively connected to the transmission line;
- detection and generation means, having first and second outputs operatively connected to the first and second inputs of said drive circuit, respectively, for determining if receive data is being received from the transmission line, for generating and outputting through the second output a timer signal having first and second logic levels and for generating and outputting through the first output a modulated pulse signal in dependance upon the transmit data to be transmitted; and
- a contact circuit, operatively connected between the third input of said drive circuit and a first reference voltage, for suppressing noise that may be generated in the output of said drive circuit when a power supply of said bus transmission system is turned on and off.

9. A bus transmission system as recited in claim 8, wherein said drive circuit comprises:
- an AND circuit, having a first input operatively connected to said detection and generation means to receive the timer signal and having a second input operatively connected to said contact circuit and having an output, for passing therethrough the timer signal; and
- a gate circuit, having a first input operatively connected to said detection and generation means to receive the modulated pulse signal, having a second input operatively connected to the output of said AND circuit and having an output operatively connected to the transmission line, for generating a first impedance value and the second logic level when the modulated pulse signal and the timer signal are received, for generating a first impedance value and the first logic level when no modulated pulse signal is received and the timer signal is received, and for generating a second impedance value whenever the timer signal is not received.

10. A bus transmission system as recited in claim 9, wherein said gate circuit comprises:
- a first transistor having a collector operatively connected to the power supply, having an emitter operatively connected to the transmission line and having a base operatively connected to the first output of said detection and generation means and to the output of said AND circuit; and
- a second transistor, having a collector operatively connected to the transmission line, having an emitter operatively connected to ground and having a base operatively connected to the first output of said detection and generation means and to the output of said AND circuit, so that when the first logic level is output by said AND circuit a high-impedance state in which said first and second transistors are non-conductive is established, so that when the second logic level is output by said AND circuit and when no modulated pulse signal is received a first level state is established in which said first transistor is non-conductive and said second transistor is conductive, and so that when the first logic level is output by said AND circuit and when the pulse modulated signal is received a second level state is established in which said first transistor is conductive and said second transistor is non-conductive.

11. A bus transmission system as recited in claim 10, wherein said drive circuit further comprises a protection circuit including:

a third transistor having a first terminal operatively connected to the transmission line, having a second terminal and having a third terminal operatively connected to the emitter of said first transistor of said gate circuit;

a first diode operatively connected between the second terminal of said third transistor and a second reference voltage;

a second diode operatively connected between the transmission line and ground; and a resistor operatively connected between the transmission line and the third terminal of said third transistor.

12. A bus transmission system as recited in claim 11, wherein said detection and generation means comprises:

a flip-flop operatively connected to the first input of said drive circuit; and a retriggerable monostable multivibrator operatively connected to the second input of said drive circuit.

* * * * *

UNITED STATES PATENT AND TRADEMARK OFFICE
CERTIFICATE OF CORRECTION

PATENT NO. :  4,388,725

DATED : June 14, 1983

INVENTOR(S) : Seiichi Saito et al

It is certified that error appears in the above-identified patent and that said Letters Patent is hereby corrected as shown below:

Front page, [73] Assignee: "A. Aoki & Associates" should be --Fujitsu Limited, Kanagawa, Japan --.

[57] ABSTRACT, line 4, "where" should be --which--.

Column 1, line 45, after "is", insert --to--.

Column 2, line 21, "accoding" should be --according--;

line 54, "ORB" should be --DRB--;

"ORC" should be --DRC--.

Column 3, line 64, delete "d-c", second occurrence;

line 66, delete "now".

Column 4, line 1, delete "(", second and third occurrences;

delete ")", first occurrence;

line 4, after "transmission", insert --line--;

UNITED STATES PATENT AND TRADEMARK OFFICE
CERTIFICATE OF CORRECTION

PATENT NO. : 4,388,725   Page 2 of 2

DATED : June 14, 1983

INVENTOR(S) : Seiichi Saito et al

It is certified that error appears in the above-identified patent and that said Letters Patent is hereby corrected as shown below:

line 8, "Von" should be --$V_{on}$--, both occurrences;

line 16, "1" should be --$\ell$--;

line 23, delete "even";

line 30, "becomes" should be --be--.

Column 6, line 16, delete "line", second occurrence.

Signed and Sealed this

Tenth Day of April 1984

[SEAL]

Attest:

GERALD J. MOSSINGHOFF

Attesting Officer     Commissioner of Patents and Trademarks